United States Patent [19]
Vollmer et al.

[11] Patent Number: 4,560,300
[45] Date of Patent: Dec. 24, 1985

[54] DISENGAGEABLE COUPLING MECHANISM FOR A DRIVE SHAFT ASSEMBLY

[75] Inventors: Jürgen Vollmer, Lohmar; Paul Herchenbach, Ruppichteroth, both of Fed. Rep. of Germany

[73] Assignee: Jean Walterscheid GmbH, Siegburg, Fed. Rep. of Germany

[21] Appl. No.: 582,458

[22] Filed: Feb. 22, 1984

[30] Foreign Application Priority Data

Mar. 2, 1983 [DE] Fed. Rep. of Germany ....... 3307339

[51] Int. Cl.$^4$ .............................................. F16D 1/10
[52] U.S. Cl. ...................................... 403/11; 403/23; 403/325; 464/169
[58] Field of Search ................. 403/23, 4, 11, 13, 325, 403/166; 464/169, 172, 901

[56] References Cited

U.S. PATENT DOCUMENTS

| 3,111,821 | 11/1963 | Edwards et al. | 464/901 X |
|---|---|---|---|
| 4,157,019 | 6/1959 | von Allworden | 464/901 X |
| 4,169,686 | 10/1979 | Balensiefen et al. | 464/901 X |
| 4,270,367 | 6/1981 | Santore | 464/169 |
| 4,338,797 | 7/1982 | Herchenbach | 464/169 X |

FOREIGN PATENT DOCUMENTS 84847  5/1958  Denmark ........................... 464/172

*Primary Examiner*—Andrew V. Kundrat
*Attorney, Agent, or Firm*—Toren, McGeady, Stanger, Goldberg & Kiel

[57] ABSTRACT

A drive shaft assembly for providing a drive connection between the power take-off shaft of a tractor and an agricultural implement is formed in two drive shaft parts with one of the parts which is attached to the tractor joint being formed with a coupling sleeve and with the other drive shaft part which is attached to the implement to be driven being formed with a coupling hub engageable and disengageable in the coupling sleeve. The other drive shaft part is also formed with a length adjusting device comprising a pair of spring-loaded telescoping tubes arranged between the coupling hub and the end of the other drive shaft part which is attached to the implement to be driven and, as a result, the disconnecting point of the drive shaft assembly is thus located between the joint which is associated with the tractor and the length adjusting device of the other drive shaft part thereby to facilitate engagement and disengagement of the drive shaft assembly.

2 Claims, 3 Drawing Figures

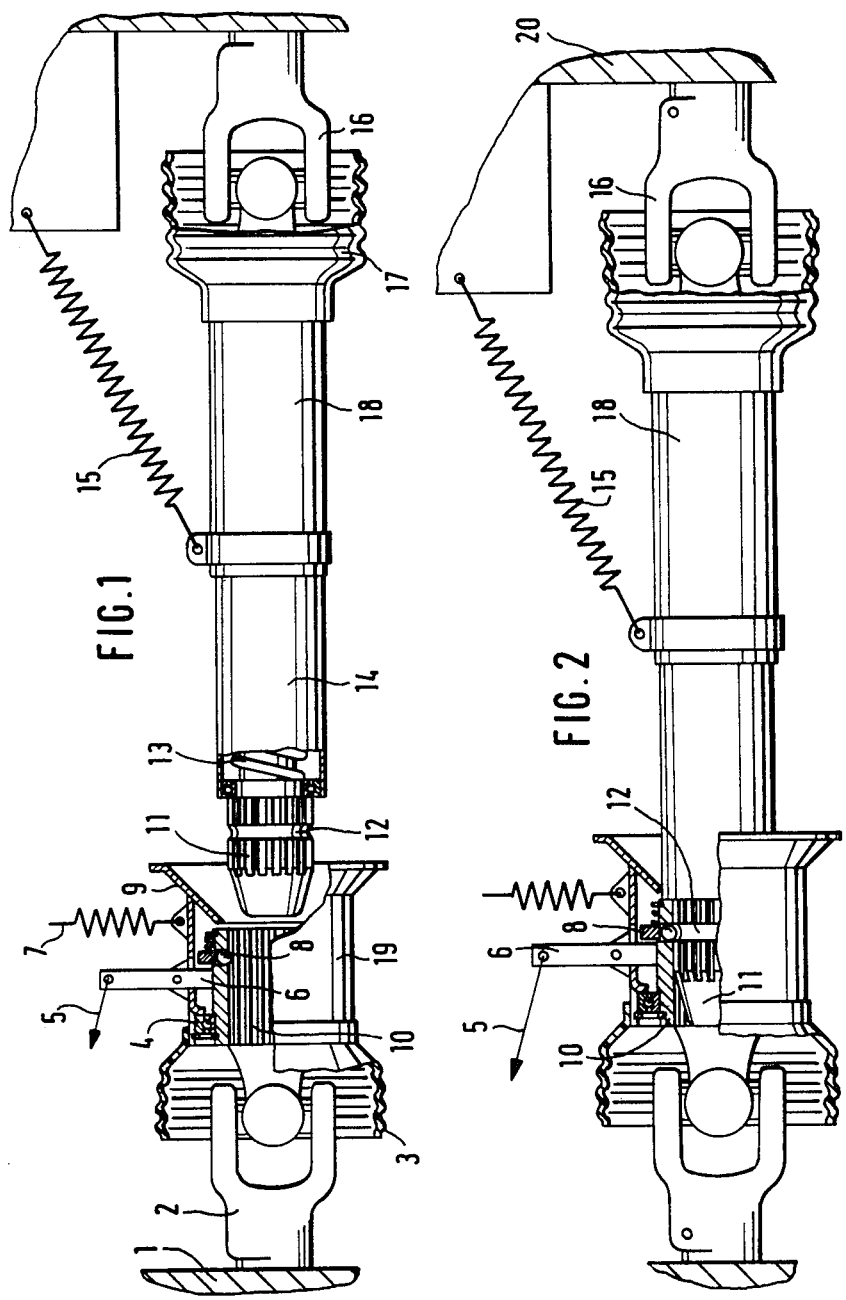

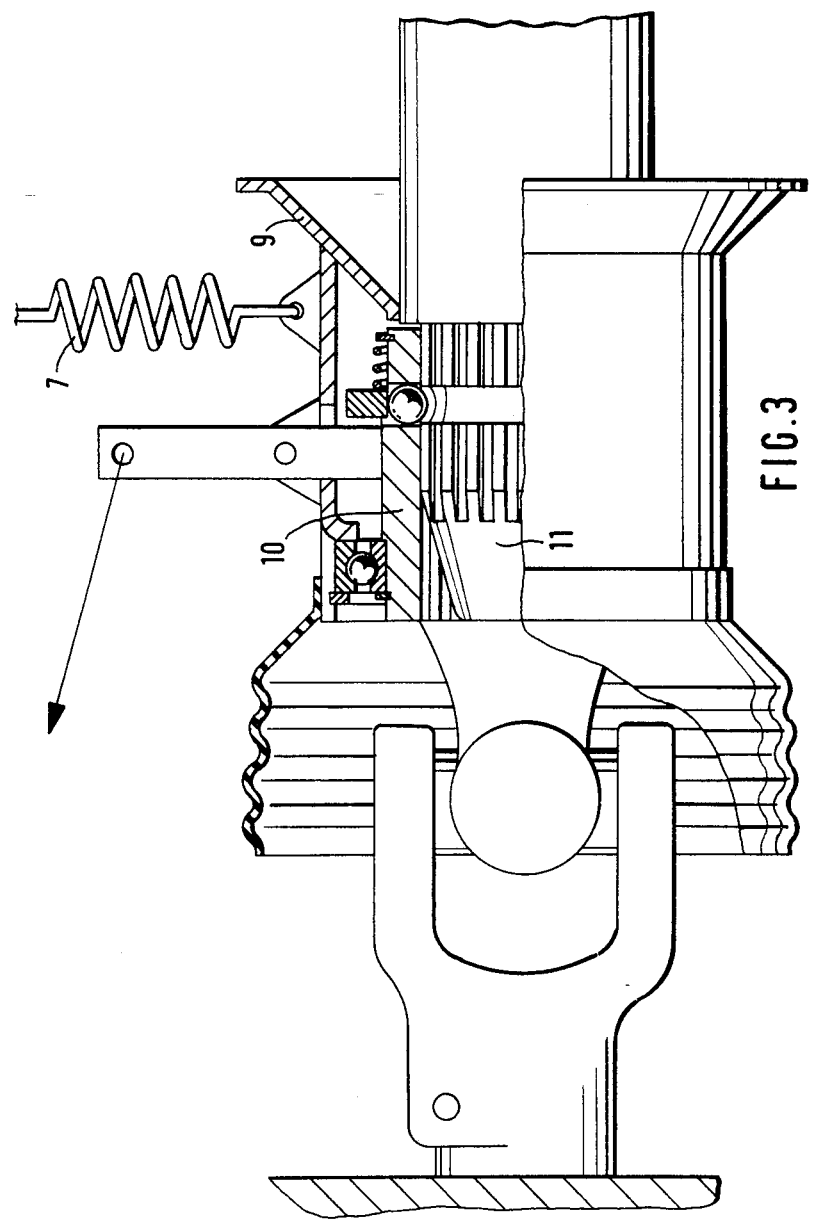

DISENGAGEABLE COUPLING MECHANISM FOR A DRIVE SHAFT ASSEMBLY

The present invention relates generally to drive shaft assemblies and more particularly to a mechanism for a drive shaft assembly which provides a disengageable drive connection between the power take-off shaft of a tractor and an agricultural implement.

In devices of the type to which the present invention relates, a coupling device is provided for automatically coupling and disengaging the drive shaft connection which extends between the power take-off shaft of the tractor and the agricultural implement. Such drive shaft assemblies are provided with a disconnecting point and with a length adjusting device which consists of a pair of profile tubes telescoping one within the other. The drive shaft parts arranged on either side of the disconnecting point each have a joint which is supported, on one side, of the tractor and, on the other side, at the agricultural implement, with a spring suspended mechanism being provided and with a drive shaft being loaded by the force of a spring in the direction of its greatest length.

A coupling device for a drive shaft assembly between the tractor and an agricultural implement which may be disconnected behind the joint at the tractor end is known in the prior art from DE-OS No. 1 555 716. In the case of the design described in this prior art, the coupling device is directly provided with two joints whose shanks on both sides are held in bearings and which, including the coupling device, are covered by a divided ball which, on the one hand, serves as a guard against accidental damage and which, on the other hand, serves as a cover preventing dirt from penetrating the device.

This ball consists essentially of a pair of hollow spherical cups which are held together by guide rings capable of being opened which have a spherical design. The coupling device, at the same time, operates the transfer traction forces to the implement or trailer which is connected.

Disadvantages of prior art coupling devices of the type described above involve the fact that there may be required excessive space. The amount of space available between the tractor and an implement to be connected thereto is at times very limited and may be restricted even further as a result of the design of the interconnecting drive assembly.

Further disadvantages of coupling devices of this type may be that, in addition to the joints which are necessary to ensure freedom of movement between the tractor and the implement, a further joint may be required. The coupling device thus becomes extremely complicated and a further complicating factor arises in that parts of the coupling device may have to be associated with the tractor and others may have to be connected with the implement to be driven so that if the implement must be changed, several of such coupling devices must be purchased and made available.

A further disadvantage of prior art coupling devices is that overall length must be deducted completely from the sliding length of the length adjustable drive shaft. This disadvantage is particularly noticeable and arises as a restriction in the freedom of movement where short connecting distances between the tractor and the agricultural implement must be utilized.

Accordingly, the present invention is directed towards providing a drive shaft assembly having a coupling mechanism which allows the drive shaft to be fitted without requiring conversion to any tractor and which does not adversely affect the sliding length of the length adjustable mechanism of the drive shaft assembly. Additionally, the drive shaft assembly of the invention makes it possible for conventional drive shafts to be used without increasing the operative complications.

SUMMARY OF THE INVENTION

Briefly, the present invention may be described as a drive shaft assembly for providing a drive engagement between the power take-off shaft of a tractor and an agricultural implement comprising: a first drive shaft part having an end adapted to be connected with the power take-off shaft of a tractor; a second drive shaft part having an end adapted to be connected with an implement to be driven; a coupling sleeve in said first drive shaft part and a coupling hub in said second drive shaft part adapted to be connected with each other to place said first and second drive shaft parts in driving engagement and adapted to be disconnected out of said driving engagement; a length adjusting device comprising a pair of telescoping tubes including a spring applying a longitudinal biasing force therebetween, said length adjusting device being provided in said second drive shaft part between the coupling hub and said end adapted to be connected with an implement to enable length variation of said second drive shaft part to facilitate connection of said coupling hub with said coupling sleeve; the disconnection point between said first and second drive shaft parts being thereby provided between a joint associated with a tractor with which said first drive shaft part is to be connected and said length adjusting device.

Thus, the objectives of the invention are achieved in that (A) the disconnecting point which is designed as the coupling device between the two drive shaft parts, i.e., the coupling sleeve and the coupling hub, is arranged between the joint which is associated with the tractor and the length adjusting device; (B) a yoke shank of the joint yoke facing the drive shaft and forming part of the joint at the tractor end may be designed as the coupling sleeve, and (C) the drive shaft end facing the tractor may be provided with a coupling hub which corresponds to the coupling sleeve with which it may be connected and disconnected.

The advantage of a coupling device for a drive shaft in accordance with the present invention is that, at the tractor end, use may be made of a standard joint which can be fitted to the power take-off shaft of the tractor by means of which any correspondingly designed drive shafts associated with agricultural implements or trailers may be easily connected and coupled. Inasmuch as the second drive shaft part and consequently the length adjusting device consisting of the profiled telescoping tubes which are adapted to telescope into each other in order to ensure length adjustment of the shaft, are associated with the implement which is to be placed in driving connection with the tractor, the length of these parts may be designed specifically to suit the particular implement.

It is preferable if the joint arranged at the tractor end and the components associated therewith and forming the coupling device are adapted to the performance of the tractor so that all implements which may be placed in driven engagement with the power take-off shaft of the tractor may be driven by means of the coupling device.

A further advantage of the coupling device in accordance with the present invention is that it may be connected to the power take-off shaft of the tractor by a high speed locking mechanism only and that it may therefore easily be removed should it become necessary to couple a conventional drive shaft in the usual manner. The spring carrying the coupling device at the tractor end and a stripping lever associated with the spring can easily be connected in a releasable manner by means of, for example, snap hooks and eyes.

It is also possible to insert a conventional drive shaft simply by replacing the outwardly pointing profile tube taking advantage of the coupling device in accordance with the invention.

In accordance with a further embodiment of the invention, the drive shaft may be provided with a freewheeling unit either at the tractor end or at the implement end. Providing freewheeling units simplifies insertion of the coupling hub into the coupling sleeve because in this manner one of the coupling parts may be made freely rotatable in one direction.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE DRAWINGS

In the drawings:

FIG. 1 is a longitudinal view partially in section showing a drive shaft assembly in accordance with the present invention in the disengaged condition;

FIG. 2 is a longitudinal view partially in section showing the drive shaft assembly in the coupled condition; and FIG. 3 is a sectional view partially broken away showing in greater detail a part of the coupling device.

DETAILED DESCRIPTION OF THE PREFERRED EMBODIMENT

Referring now to the drawings, there is shown a drive shaft assembly which is formed in two parts, a first part being connected to a tractor 1 shown only in part in FIG. 1, with the second part of the drive shaft assembly being connected to a joint 16 attached to an implement 20. The first and second parts of the drive shaft assembly are adapted to be engaged in driving connection, as shown in FIG. 2, and to be disengaged as shown in FIG. 1.

The first part of the drive shaft assembly is adapted to be connected to the power take-off shaft (not shown) of the tractor 1 by means of a joint 2 provided at the tractor end. A yoke shank of the joint yoke facing the drive shaft assembly is designed as a coupling sleeve 10 which is provided with an inner profile adapted to engage therein a coupling hub 11 formed on the other or second drive shaft assembly part. The coupling sleeve 10 is provided with a locking mechanism 8 for axially locking in driving engagement with the coupling sleeve 10 the coupling hub 11. By means of a bearing 4, the coupling sleeve 10 carries a housing 19 which, in turn, carries a stripping lever 6 which is pivotable by means of an operating cable 5.

The housing 19 of the first part of the drive shaft assembly is connected with a spring 7 which permits the coupling mechanism to be adjusted in the vertical plane providing the spring 7 is connected to, for example, the lifting arms of the tractor. At the housing 19, provision is made for an introducing funnel 9 which facilitates alignment of the coupling hub 11 relative to the coupling sleeve 10.

A protective funnel 3 encloses the joint 2 at the tractor end in order to prevent the joint 2 from being touched by operating personnel.

By means of the further joint 16, the drive shaft assembly is connected to the implement 20 which is to be driven and, in accordance with safety regulations, the drive shaft assembly is surrounded by a pair of protective tubes 14 and 18 which are capable of being telescopically inserted into each other. The outer protective tube 18 is connected to a fixed point at the implement 20 by means of a spring 15.

In order to enable maintenance of the extended length of the second part of the drive shaft assembly during the coupling process, the drive shaft assembly is formed essentially to comprise the two telescopic tubes which can be inserted into each other with these tubes being provided with a compression spring 13 which is preferably arranged inside of the second part of the drive shaft assembly and which loads the second part of the drive shaft assembly in the direction of its greatest length by applying longitudinal spring force between the protective tubes 14 and 18. Since the protective tubes 14 and 18 and the respective shaft parts are joined for axial movement telescopically with each other, the spring 13 will apply its force to both regardless of whether it is directly connected between the shaft parts or the protective tubes.

The free end of the second part of the drive shaft assembly is provided with the coupling hub 11 which is formed with a profile corresponding to the profile of the coupling sleeve 10, i.e., with longitudinal splines, and wherein provision is made for an annular groove 12 which may operate in association with a locking mechanism 8 in order to ensure axial locking of the coupling hub 11 in the coupling sleeve 10.

FIG. 2 illustrates the drive shaft assembly in its engaged torque transmitting condition with the coupling hub 11 secured in the coupling sleeve 10 by the locking mechanism 8. In order to release the axial locking connection between the coupling hub 11 and the coupling sleeve 10, the stripping lever 6 is actuated, for example, by means of the tension cable 5 in the direction of the arrow and the locking ring of the locking mechanism will be displaced in the opening direction in such a way that the locking members will be capable of sliding out of the annular groove 12 of the coupling hub 11.

Thus, the coupling hub 11 and the second drive shaft part may be disengaged from the coupling sleeve 10 and the first drive shaft part into the condition shown in FIG. 1.

FIG. 3 shows in greater detail the coupling device when it is in the engaged or coupled condition.

It will thus be seen from the foregoing that the present invention provides a device which is capable of automatically coupling and disengaging a drive shaft arranged between the power take-off shaft of a tractor and an agricultural implement.

In accordance with the present invention, the coupling point of the assembly will be the shank of the joint yoke of the joint at the tractor end pointing away from the tractor, with this shank being designed as a coupling sleeve 10. The free end of the second drive shaft part is provided with the coupling hub 11 whose outer profile corresponds to the inner profile of the coupling sleeve 10 and the coupling hub 11 is axially secured in the coupling sleeve 10 by means of the locking mechanism 8. In order to disengage the drive shaft assembly, a locking ring associated with the locking mechanism is open by means of a stripping lever in such a manner as to enable the locking members to slide out of the annular groove associated with the coupling hub. The drive shaft part which is connected to the implement and which is formed with the length adjusting device comprising the tubes 14 and 18 is held in an extended position by means of the pressure spring 13 which is preferably arranged inside of the drive shaft part so that it cannot become disengaged during the coupling process.

Thus, in accordance with the invention, it will be noted that the length adjusting device including the protective tubes 14 and 18 is located between the end of the drive shaft part having the connecting hub 11 and the end connected to the implement. The other drive shaft part which is attached to the tractor power take-off shaft is formed with the coupling sleeve which engages with the free end of the drive shaft part having the coupling hub 11. As a result, engagement and disengagement is facilitated and space saving advantages are realized.

While a specific embodiment of the invention has been shown and described in detail to illustrate the application of the inventive principles, it will be understood that the invention may be embodied otherwise without departing from such principles.

What is claimed is:

1. A drive shaft assembly for providing a drive connection between the power take-off shaft of a tractor and an agricultural implement comprising:
    a first drive shaft part having an end adapted to be connected with the power take-off shaft of a tractor;
    a second drive shaft part having an end adapted to be connected with an implement to be driven;
    a coupling sleeve in said first drive shaft part and a coupling hub in said second drive shaft part adapted to be connected with each other to place said first and second drive shaft parts in driving engagement and to be disconnected to separate said driving engagement; and
    a length adjusting device comprising a pair of telescoping tubes including a spring applying a longitudinal biasing force therebetween, said length adjusting device being provided in said second drive shaft part between said coupling hub and said end adapted to be connected with an implement to enable length variation of said second drive shaft part to facilitate connection of said coupling hub with said coupling sleeve; the disconnection point between said first and second drive shaft parts being thereby provided at a location between a joint associated with a tractor with which said first drive shaft part is to be connected and said length adjusting device.

2. An assembly according to claim 1, wherein said drive shaft assembly is provided with a freewheeling unit at one of said first drive shaft part and said second drive shaft part.

* * * * *